United States Patent [19]

Seri et al.

[11] Patent Number: 5,205,985
[45] Date of Patent: Apr. 27, 1993

[54] HYDROGEN STORAGE ALLOY AND HYDRIDE ELECTRODES HAVING C15 CRYSTAL STRUCTURE

[75] Inventors: Hajime Seri, Izumiotsu; Yoshio Moriwaki, HIrakata; Yasuharu Yamamura, Katano; Yoichiro Tsuji, Hirakata; Tsutomu Iwaki, Yawata, all of Japan

[73] Assignee: Matsushita Electric Industrial Co., Ltd., Osaka, Japan

[21] Appl. No.: 858,366

[22] Filed: Mar. 26, 1992

[30] Foreign Application Priority Data

Mar. 29, 1991 [JP] Japan .................................. 3-066354
Mar. 29, 1991 [JP] Japan .................................. 3-66355
Mar. 29, 1991 [JP] Japan .................................. 3-66359

[51] Int. Cl.$^5$ .................................. C22C 22/00
[52] U.S. Cl. .................................. 420/422; 148/421; 420/900
[58] Field of Search .................. 420/422, 900; 148/421

[56] References Cited

U.S. PATENT DOCUMENTS

| | | | |
|---|---|---|---|
| 4,839,085 | 6/1989 | Sandrock et al. | 420/900 |
| 4,946,646 | 8/1990 | Gamo et al. | 420/415 |
| 4,983,474 | 1/1991 | Doi et al. | 420/900 |
| 5,096,667 | 3/1992 | Fetcenko | 420/900 |
| 5,149,383 | 9/1992 | Seri et al. | 420/900 |

FOREIGN PATENT DOCUMENTS

| | | |
|---|---|---|
| 0413029 | 2/1991 | European Pat. Off. . |
| 0450590 | 10/1991 | European Pat. Off. . |
| 6460961 | 3/1989 | Japan . |
| 1-102855 | 4/1989 | Japan . |

*Primary Examiner*—Upendra Roy
*Attorney, Agent, or Firm*—Panitch, Schwarze, Jacobs & Nadel

[57] ABSTRACT

A hydrogen storage alloy preferably used for electrodes in an alkaline storage battery is provided. The alloy is of the general formula $ZrMn_wV_xM_yNi_z$ which comprises C15-type Laves phases having a crystal structure similar to that of $MgCu_2$ as a main alloy phase, where M is an element selected from the group consisting of Fe and Co; w, x, y, and z are respectively the mole ratios of Mn, V, M and Ni to Zr; the conditions $0.4 \leq w \leq 0.8$, $0.1 \leq x \leq 0.3$, $0 \leq y \leq 0.2$, $1.0 \leq z \leq 1.5$ and $2.0 \leq w+x+y+z \leq 2.4$ are satisfied.

7 Claims, 5 Drawing Sheets

HYDROGEN STORAGE ALLOY AND HYDRIDE ELECTRODES HAVING C15 CRYSTAL STRUCTURE

BACKGROUND OF THE INVENTION

1. Field of the Invention

The present invention relates to a hydrogen storage alloy which can electrochemically absorb and desorb hydrogen in a reversible manner, and it also relates to an electrode using the hydrogen storage alloy.

2. Description of the Prior Art

Storage batteries, which are widely used as a variety of power sources, have two general classifications: lead and alkaline. Compared with lead storage batteries, alkaline storage batteries have higher reliability and can be made smaller in size, so that they are used in various kinds of portable electric devices. On the other hand, large-sized alkaline storage batteries are widely used for industrial equipment.

Some alkaline storage batteries use, for example, air or silver oxide for their positive electrodes. But in most cases, the positive electrodes are made of nickel. The positive electrodes of alkaline storage batteries have previously been of a pocket type, but at present, those of a sintered type are generally used. This change in the configuration of the positive electrodes has improved the characteristics of the alkaline storage batteries. Furthermore, it has become possible to hermetically seal the batteries, so that the alkaline storage batteries have come to find wider application.

As the negative electrodes of alkaline storage batteries, cadmium electrodes are generally used. Other materials for the negative electrodes include zinc, iron, hydrogen, and the like.

The cadmium electrodes, however, have a small theoretical energy capacity. Zinc electrodes also have disadvantages in that they are susceptible to deformation and that dendrites tend to be formed therein.

In order to attain a larger energy capacity, an electrode made of a metal such as a hydrogen storage alloy or a hydride thereof has been developed to be used in, for example, a nickel-hydrogen storage battery. Many methods for the production of such a nickel-hydrogen storage battery have been proposed.

A hydrogen storage alloy such as mentioned above can absorb and desorb hydrogen through a reversible electrochemical reaction. When the negative electrode of an alkaline storage battery is made of this hydrogen storage alloy, it attains a larger theoretical energy capacity, as compared with the cadmium electrodes. Furthermore, unlike the zinc electrodes, when using the hydrogen storage alloy electrode, neither deformation of the electrode nor dendrite-growth in the electrode occurs. Therefore, it is expected that hydrogen storage alloys will provide electrodes having a large energy capacity and a longer lifetime with no possibility of causing pollution.

Examples of well known hydrogen storage alloys to be used for electrodes include multi-element alloys such as those of the Ti-Ni system, the La(or Mm)-Ni system (Mm is a misch metal), and the like.

The Ti-Ni alloys are of an AB type. When such a Ti-Ni alloy is used for the negative electrode of an alkaline storage battery, the electrode exhibits relatively large discharging capacities in the early charging and discharging cycles. With the repetition of charging and discharging, however, it becomes difficult to keep the discharging capacity from decreasing undesirably.

The La(or Mm)-Ni alloys are known as $AB_5$-type multi-element alloys. Many attempts have recently been made to develop alloys of this type because they have been considered as suitable materials for electrodes. However, an electrode using the La(or Mm)-Ni alloy has a relatively small discharging capacity and a short lifetime. Furthermore, materials for the La(or Mm)-Ni alloys are expensive.

Another hydrogen storage alloy which has been developed is a Laves phase alloy of an $AB_2$ type (where A is Zr, Ti, or the like, which has a high affinity for hydrogen, and B is Ni, Mn, Cr or one of other transition elements). The Laves phase alloys have a large capacity for absorbing hydrogen, and electrodes using these alloys have a large energy capacity and a long lifetime. As examples of the Laves phase alloys, there are an alloy of the $AB_a$ system (U.S. Pat. No. 4,946,646), an alloy of the $Zr\alpha V\beta Ni\gamma M\delta$ system (Japanese Laid-open Patent Publication No. 64-60961), an alloy of the $A_xB_yNi_z$ system (Japanese Laid-open Patent Publication No. 1-102855), and the like.

Electrodes using the above-mentioned conventional Laves phase alloys have a long lifetime and a large discharging capacity, as compared with electrodes using the multi-element alloys such as Ti-Ni and La(or Mm)-Ni alloys. However, the conventional Laves phase alloy electrodes have poor discharging characteristics in the early charging and discharging cycles.

A Laves phase alloy of the Zr-Mn-V-Cr-Ni system is known as another hydrogen storage alloy, but it also has the following disadvantage. When an electrode using this alloy is included in an alkaline storage battery, it cannot efficiently absorb or desorb a large amount of hydrogen in the early cycles of its electrochemical charging and discharging.

Thus, there has been a great demand for a novel hydrogen storage alloy which can be used to produce an electrode having a large energy capacity and a long lifetime and exhibiting excellent discharging characteristics in the early charging and discharging cycles.

SUMMARY OF THE INVENTION

The hydrogen storage alloy of this invention, which overcomes the above-discussed and numerous other disadvantages and deficiencies of the prior art, is shown by the general formula $ZrMn_wV_xM_yNi_z$ which comprises C15-type Laves phases and has a crystal structure similar to that of $MgCu_2$ as a main alloy phase, where M is an element selected from the group consisting of Fe and Co; w, x, y, and z are respectively the mole ratios of Mn, V, M and Ni to Zr; the conditions $0.4 \leq w \leq 0.8$, $0.1 \leq x \leq 0.3$, $0 \leq y \leq 0.2$, $1.0 \leq z \leq 1.5$ and $2.0 \leq w+x+y+z \leq 2.4$ are satisfied.

In a preferred embodiment, V, M and Ni are contained in the alloy in such amounts so as to satisfy the relationships $y \leq x$ and $z - x \leq 1.2$.

In a preferred embodiment, the hydrogen storage alloy has been heat-treated at a temperature of 1,000° C. to 1,300° C. in a vacuum or in an inert-gaseous atmosphere.

A hydrogen storage alloy electrode of this invention comprises the above-mentioned hydrogen storage alloy or a hydride thereof.

Thus, the invention described herein makes possible the objectives of (1) providing an alloy which can electrochemically absorb and desorb a large amount of hydrogen with high efficiency from the early charging and discharging cycles; and (2) providing an electrode which uses the above-mentioned alloy and can be used for the production of an alkaline storage battery such as a nickel-hydrogen storage battery so as to ensure a large discharging capacity in the battery and to attain excellent discharging characteristics in the early charging and discharging cycles thereof.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

The inventors have intensively studied Laves phase alloys of the system obtained by replacing Cr of the conventional Zr-Mn-V-Cr-Ni system with Co or Fe, or by removing Cr therefrom, and have come to accomplish the present invention.

A hydrogen storage alloy of the present invention is of the formula $ZrMn_wV_xM_yNi_z$, where M is an element selected from the group consisting of Fe and Co; w, x, y and z are respectively the mole ratios of Mn, V, M and Ni to Zr; the conditions $0.4 \leq w \leq 0.8$, $0.1 \leq x \leq 0.3$, $0 \leq y \leq 0.2$, $1.0 \leq z \leq 1.5$ and $2.0 \leq w+x+y+z \leq 2.4$ are satisfied.

As described above, according to the present invention, the w, that is, the mole ratio of Mn to Zr, is preferably in the range of 0.4 to 0.8. This range is determined as described below.

The content of Mn in a hydrogen storage alloy influences the hydrogen equilibrium pressure for the alloy. The hydrogen equilibrium pressure can be shown in a P (hydrogen equilibrium pressure)—C (composition)=T (temperature) measurement curve (i.e., pressure-composition isotherm). At the pressure corresponding to a substantially horizontal portion of the pressure-composition isotherm, a large amount of hydrogen is absorbed by or desorbed from the alloy. Thus, as the pressure-composition isotherm has a longer horizontal portion, the hydrogen storage capacity of the alloy becomes larger.

Figure 1:
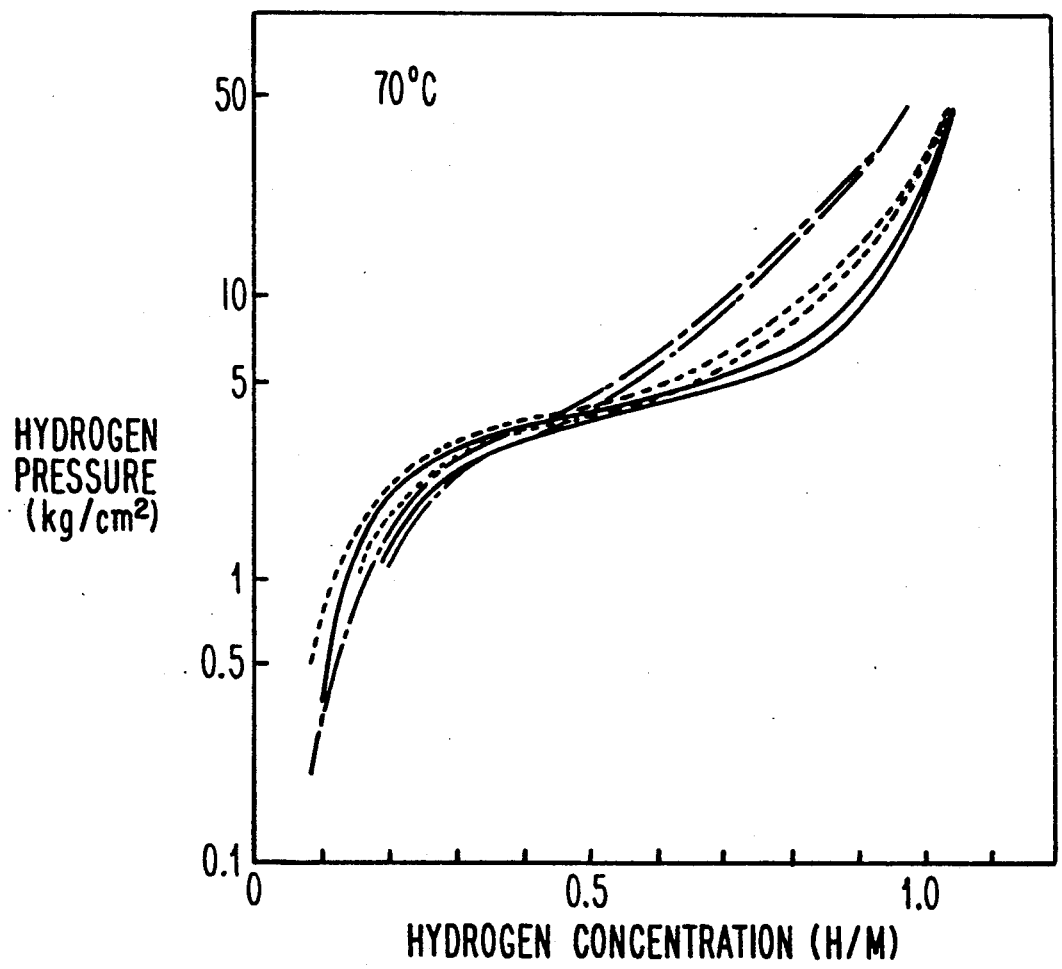
FIG. 1 shows pressure-composition isotherms of hydrogen storage alloys differing in the mole ratios of Mn and Cr to Zr.
Figure 2:
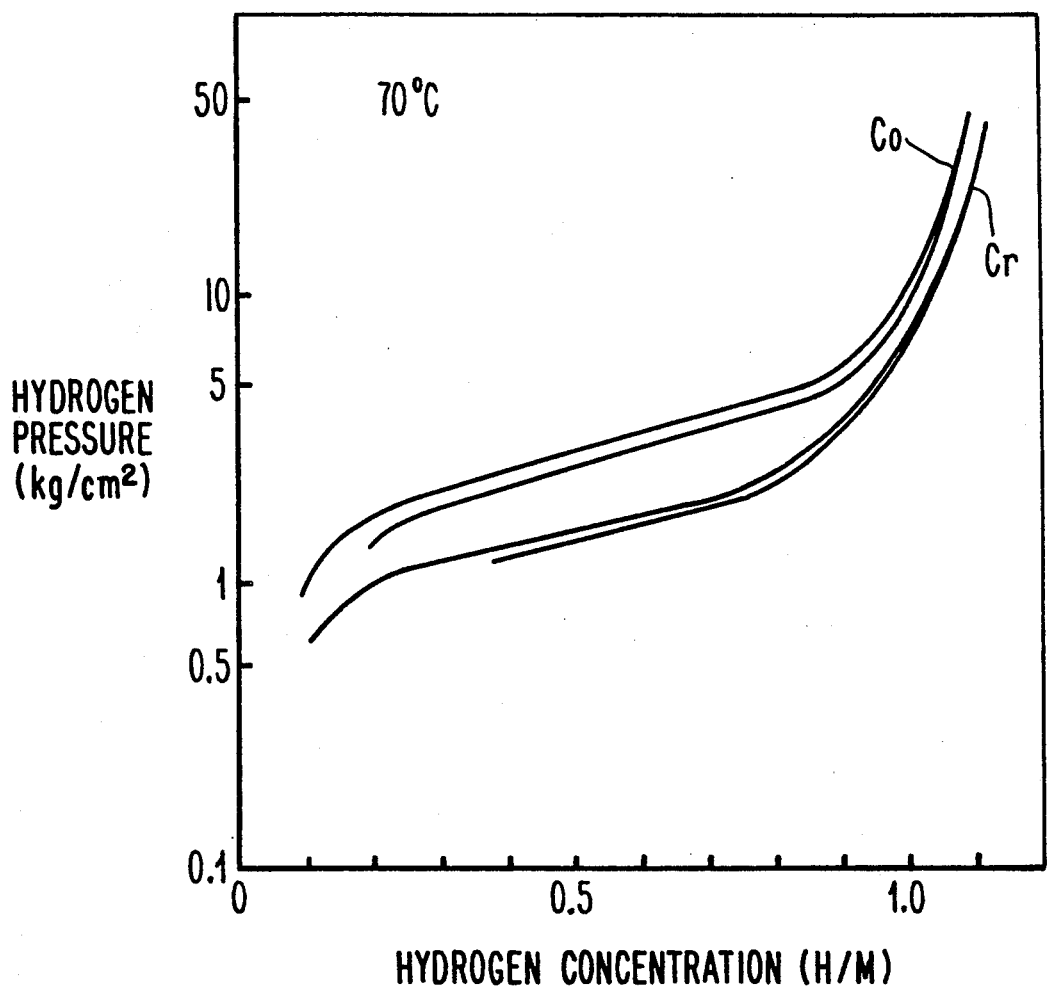
FIG. 2 shows pressure-composition isotherms of a hydrogen storage alloy of sample 11 obtained in Example 1 described below and an alloy having the same composition as that of the alloy sample 11 except that Co is replaced by Cr.

FIG. 1 shows pressure-composition isotherms for hydrogen storage alloys of the formula $ZrMn_wV_{0.1}Cr_{0.6-w}Ni_{1.3}$ with different values of w. The dash-dot lines are isotherms in the case where the w is 0.2, the dot lines in the case where the w is 0.3, and the solid lines in the case where the w is 0.4. FIG. 2 shows pressure-composition isotherms of (a) $ZrMn_{0.6}V_{0.2}Co_{0.1}Ni_{1.2}$ (of sample 11 of the present invention prepared as described in Example 1) and (b) $ZrMn_{0.6}V_{0.2}Cr_{0.1}Ni_{1.2}$.

In FIGS. 1 and 2, the upper line of each pair of isotherms is a hydrogen-absorption curve while the lower line is a hydrogen-desorption curve.

As can be seen from FIG. 1, the pressure-composition isotherms have the longest horizontal portions when the w is 0.4. The isotherms for the alloys with the w being 0.6 shown in FIG. 2 also have long horizontal portions similar to those shown in FIG. 1 for the alloy with the w being 0.4. This means that the alloys have a large hydrogen storage capacity whether the w is 0.4 or 0.6. Furthermore, as shown in FIG. 2, the horizontal portions of the isotherms are satisfactorily long whether the alloy includes Cr or Co. Therefore, in the hydrogen storage alloys of the present invention, the w is preferably 0.4 or more.

On the other hand, when w exceeds 0.8, a large amount of Mn is eluted into the electrolytic solution, so that the lifetime of an electrode using the alloy becomes short. Thus, it is preferable that the mole ratio of Mn to Zr (w) be in the range of 0.4 to 0.8.

The x, that is, the mole ratio of V to Zr, is preferably in the range of 0.1 to 0.3. V contained in a hydrogen storage alloy contributes to an increase in the amount of hydrogen to be absorbed by or desorbed from the alloy. When the x is less than 0.1, V does not improve the hydrogen storage capacity of the alloy. When the x is more than 0.3, the homogeneity of the alloy deteriorates, thereby decreasing the hydrogen storage capacity thereof. Accordingly, it is preferred that the x be in the range of 0.1 to 0.3.

It is preferable that the y, that is, the mole ratio of Fe or Co to Zr, be in the range of 0 to 0.2, and that the z, that is, the mole ratio of Ni to Zr, be in the range of 1.0 to 1.5. Also, it is preferable that the relationships $y \leq x$ and $z-x \leq 1.2$ be satisfied. These ranges and relationships are determined as described below.

The effect of Co, Fe and Ni on the alloy is opposite to that of V; that is, they decrease the amount of hydrogen to be absorbed by or desorbed from the alloy. However, they bring about the activation for the electrochemical process of absorbing or desorbing hydrogen. Thus, the mole ratios of Co or Fe (y) and Ni (z) to Zr are significant for the hydrogen absorbing and desorbing processes. With the conditions $y > 0.2$ and $z > 1.5$, the amount of hydrogen to be absorbed by or desorbed from the alloy becomes extremely small. On the other hand, with the conditions $z < 1.0$, it becomes impossible to attain sufficient activation for the electrochemical process of absorbing or desorbing hydrogen. Consequently, it is preferable that the conditions $0 \leq y \leq 0.2$ and $1.0 \leq z \leq 1.5$ be satisfied.

Since the effect of V on the hydrogen storage alloy is opposite to that of Fe, Co and Ni as described above, the relationships between the x (mole ratio of V to Zr) and the y (mole ratio of Fe or Co to Zr) and between the x and the z (mole ratio of Ni to Zr) also determine the hydrogen storage capacity of the alloy. With the relationships $y > x$ and $z - x > 1.2$, the amount of hydrogen to be absorbed by or desorbed from the alloy tends to decrease. Accordingly, it is preferable that the relationships $y \leq x$ and $z - x \leq 1.2$ be satisfied.

Furthermore, according to the present invention, the condition $2.0 \leq w+x+y+z \leq 2.4$ is required to be satisfied so that the hydrogen storage alloy has C15-type Laves phases which ensure a large hydrogen storage capacity.

For the production of a C15-type Laves phase alloy according to the present invention, the respective metals described above are melted with the application of heat, for example, in an atmosphere of argon by using an arc melting furnace. X-ray diffraction can be used to examine whether the resultant alloy has a Laves phases.

The alloy thus obtained is heat-treated, for example, at 1100° C. in a vacuum for about 12 hours, thereby increasing the proportion of C15-type Laves phases to the whole alloy. This improves the homogeneity and crystallinity of the alloy, so that the resultant alloy has a large hydrogen storage capacity to provide an electrode which exhibits excellent discharging characteristics in the early charging and discharging cycles.

The crystal lattice constant a of the hydrogen storage alloy of the present invention is preferably in the range of 7.03 Å to 7.10 Å.

The alloy obtained in the above-described manner can be used as an electrode without further treatment, or after hydrogenation.

EXAMPLES

The invention will be further described by reference to the following examples.

EXAMPLE 1

Commercially available Zr, Mn, V, Co, Fe and Ni were used to produce hydrogen storage alloys of the present invention with different compositions as listed from sample Nos. 3 to 46 in Table 1 below. Each alloy sample was produced as follows:

First, Zr, Mn, V and Ni were either placed together with Co or Fe, or with neither of them, in an arc melting furnace, where the metals were melted in an atmosphere of argon to form an alloy. The alloy thus obtained was then heat-treated at 1100° C. in a vacuum for 12 hours, resulting in a hydrogen storage alloy.

For the purpose of comparison, conventional hydrogen storage alloys were also prepared as samples 1 and 2 as shown in Table 1, in the same manner as described above except that Cr was used in addition to Zr, Mn, V and Ni.

TABLE 1

| Example No. | Composition |
|---|---|
| 1 | $ZrMn_{0.4}V_{0.1}Cr_{0.4}Ni_{1.2}$ |
| 2 | $ZrMn_{0.4}V_{0.2}Cr_{0.2}Ni_{1.4}$ |
| 3 | $ZrMn_{0.4}V_{0.2}Co_{0.2}Ni_{1.2}$ |
| 4 | $ZrMn_{0.6}V_{0.2}Co_{0.2}Ni_{1.2}$ |
| 5 | $ZrMn_{0.4}V_{0.2}Co_{0.2}Ni_{1.3}$ |
| 6 | $ZrMn_{0.6}V_{0.1}Co_{0.1}Ni_{1.2}$ |
| 7 | $ZrMn_{0.4}V_{0.3}Co_{0.2}Ni_{1.3}$ |
| 8 | $ZrMn_{0.5}V_{0.2}Co_{0.2}Ni_{1.2}$ |
| 9 | $ZrMn_{0.4}V_{0.3}Co_{0.2}Ni_{1.4}$ |
| 10 | $ZrMn_{0.7}V_{0.2}Co_{0.2}Ni_{1.2}$ |
| 11 | $ZrMn_{0.6}V_{0.2}Co_{0.1}Ni_{1.2}$ |
| 12 | $ZrMn_{0.5}V_{0.2}Co_{0.2}Ni_{1.3}$ |
| 13 | $ZrMn_{0.5}V_{0.2}Co_{0.2}Ni_{1.2}$ |
| 14 | $ZrMn_{0.5}V_{0.3}Co_{0.2}Ni_{1.2}$ |
| 15 | $ZrMn_{0.5}V_{0.2}Co_{0.2}Ni_{1.3}$ |
| 16 | $ZrMn_{0.4}V_{0.3}Co_{0.2}Ni_{1.2}$ |
| 17 | $ZrMn_{0.6}V_{0.2}Co_{0.1}Ni_{1.3}$ |
| 18 | $ZrMn_{0.6}V_{0.2}Co_{0.2}Ni_{1.2}$ |
| 19 | $ZrMn_{0.4}V_{0.2}Fe_{0.2}Ni_{1.2}$ |
| 20 | $ZrMn_{0.6}V_{0.2}Fe_{0.2}Ni_{1.2}$ |
| 21 | $ZrMn_{0.4}V_{0.2}Fe_{0.2}Ni_{1.3}$ |
| 22 | $ZrMn_{0.6}V_{0.1}Fe_{0.1}Ni_{1.2}$ |
| 23 | $ZrMn_{0.4}V_{0.3}Fe_{0.2}Ni_{1.3}$ |
| 24 | $ZrMn_{0.5}V_{0.3}Fe_{0.2}Ni_{1.2}$ |
| 25 | $ZrMn_{0.4}V_{0.2}Fe_{0.2}Ni_{1.4}$ |
| 26 | $ZrMn_{0.7}V_{0.2}Fe_{0.2}Ni_{1.2}$ |
| 27 | $ZrMn_{0.6}V_{0.2}Fe_{0.1}Ni_{1.2}$ |
| 28 | $ZrMn_{0.5}V_{0.2}Fe_{0.2}Ni_{1.3}$ |
| 29 | $ZrMn_{0.5}V_{0.2}Fe_{0.2}Ni_{1.2}$ |
| 30 | $ZrMn_{0.6}V_{0.3}Fe_{0.2}Ni_{1.2}$ |
| 31 | $ZrMn_{0.5}V_{0.3}Fe_{0.2}Ni_{1.3}$ |

TABLE 1-continued

| Example No. | Composition |
|---|---|
| 32 | $ZrMn_{0.4}V_{0.3}Fe_{0.2}Ni_{1.2}$ |
| 33 | $ZrMn_{0.6}V_{0.2}Fe_{0.1}Ni_{1.3}$ |
| 34 | $ZrMn_{0.6}V_{0.2}Fe_{0.2}Ni_{1.3}$ |
| 35 | $ZrMn_{0.6}V_{0.2}Ni_{1.2}$ |
| 36 | $ZrMn_{0.6}V_{0.2}Ni_{1.3}$ |
| 37 | $ZrMn_{0.5}V_{0.2}Ni_{1.3}$ |
| 38 | $ZrMn_{0.5}V_{0.3}Ni_{1.3}$ |
| 39 | $ZrMn_{0.5}V_{0.3}Ni_{1.4}$ |
| 40 | $ZrMn_{0.7}V_{0.2}Ni_{1.2}$ |
| 41 | $ZrMn_{0.7}V_{0.1}Ni_{1.2}$ |
| 42 | $ZrMn_{0.6}V_{0.1}Ni_{1.3}$ |
| 43 | $ZrMn_{0.4}V_{0.25}Ni_{1.35}$ |
| 44 | $ZrMn_{0.6}V_{0.3}Ni_{1.3}$ |
| 45 | $ZrMn_{0.5}V_{0.3}Ni_{1.2}$ |
| 46 | $ZrMn_{0.7}V_{0.3}Ni_{1.3}$ |

Part of each sample was analyzed by, for example, X-ray diffraction, another part was subjected to P-C-T measurement, and the remaining part was used for the evaluation of electrode characteristics.

Figure 3:
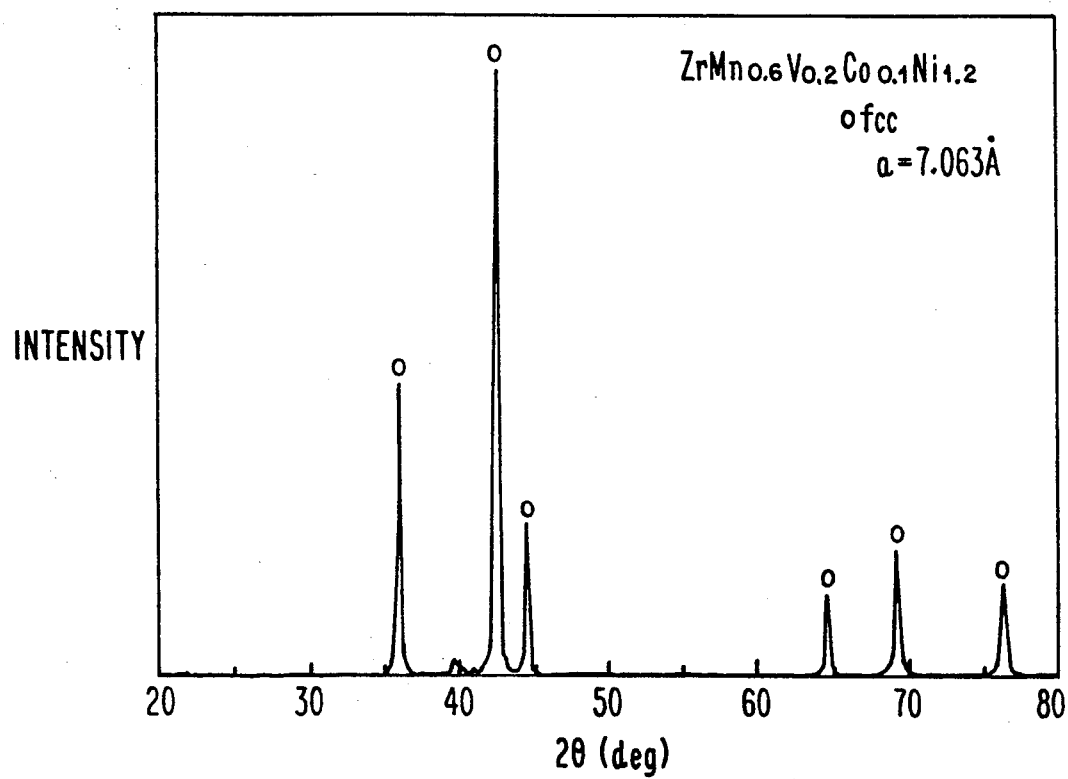
FIG. 3 shows an X-ray diffraction pattern of the alloy sample 11.

The X-ray diffraction was performed for each sample after the above-described heat treatment in a vacuum. The results of the X-ray diffraction proved that the phases of each alloy sample were mainly C15-type Laves phases having a crystal structure of $MgCu_2$ fcc. As a typical example of the X-ray diffraction results, FIG. 3 shows the X-ray diffraction pattern for the sample 11. In FIG. 3, peaks accompanied by open circles represent C15-type Laves phases. As can be seen from FIG. 3, there are very few peaks representing other alloy phases. This means that the C15-type Laves phases constitute most part of the alloy sample 11.

Also as a result of the X-ray diffraction performed on the sample 11, the crystal lattice constant a thereof was found to be 7.063 Å.

The X-ray diffraction was also performed before the heat treatment. As a result, it was found that the peaks representing fcc structures (C15-type Laves phases) were higher and more acute in the heat-treated alloys than in those subjected to no heat treatment. This indicates that the heat treatment increased the proportion of C15-type Laves phases to the entire part of each alloy and accordingly improved the homogeneity and crystallinity thereof.

EXAMPLE 2

Half cell test

Each alloy obtained in Example 1 was subjected to a half cell test for the evaluation of the electrochemical charging and discharging characteristics thereof as a negative electrode of an alkaline storage battery, especially for the evaluation of the discharging characteristics in the early charging and discharging cycles.

First, each of the alloy samples 1 to 46 was ground to 400 mesh or finer. To 1 g of each resultant alloy powder, 3 g of nickel carbonyl powder and 0.12 g of polyethylene fine powder were added as a conductive material and a binder, respectively. The whole was thoroughly stirred and mixed. The mixture thus obtained was then formed with the application of pressure into a disk of 24.5 mm in diameter and 2.5 mm in thickness. The disk was heated at 130° C. in a vacuum for 1 hour, so that the binder was melted therein, resulting in a hydrogen storage alloy electrode.

A nickel lead wire was attached to the hydrogen storage alloy electrode, which was thus used as a negative electrode. As a positive electrode, a sintered nickel electrode with excessive capacity was used. The thus prepared negative and positive electrodes were placed, with a separator therebetween, in an electrolytic solution, thereby constituting a half cell structure to be used for the half cell test. As the separator, a polyamide nonwoven fabric was used. The electrolytic solution was an aqueous potassium hydroxide solution with a specific gravity of 1.30.

Using the half cell structure thus obtained for each sample, charging and discharging were repeated at a constant current at a temperature of 25° C. The discharging capacity of the cell was measured in each of the charging and discharging cycles. In charging, a current of 100 mA was supplied for 5 hours for every 1 g of the hydrogen storage alloy. Discharging was performed at the current of 50 mA also for every 1 g of the hydrogen storage alloy and continued until the cell voltage decreased to 0.8 V.

Figure 4A:
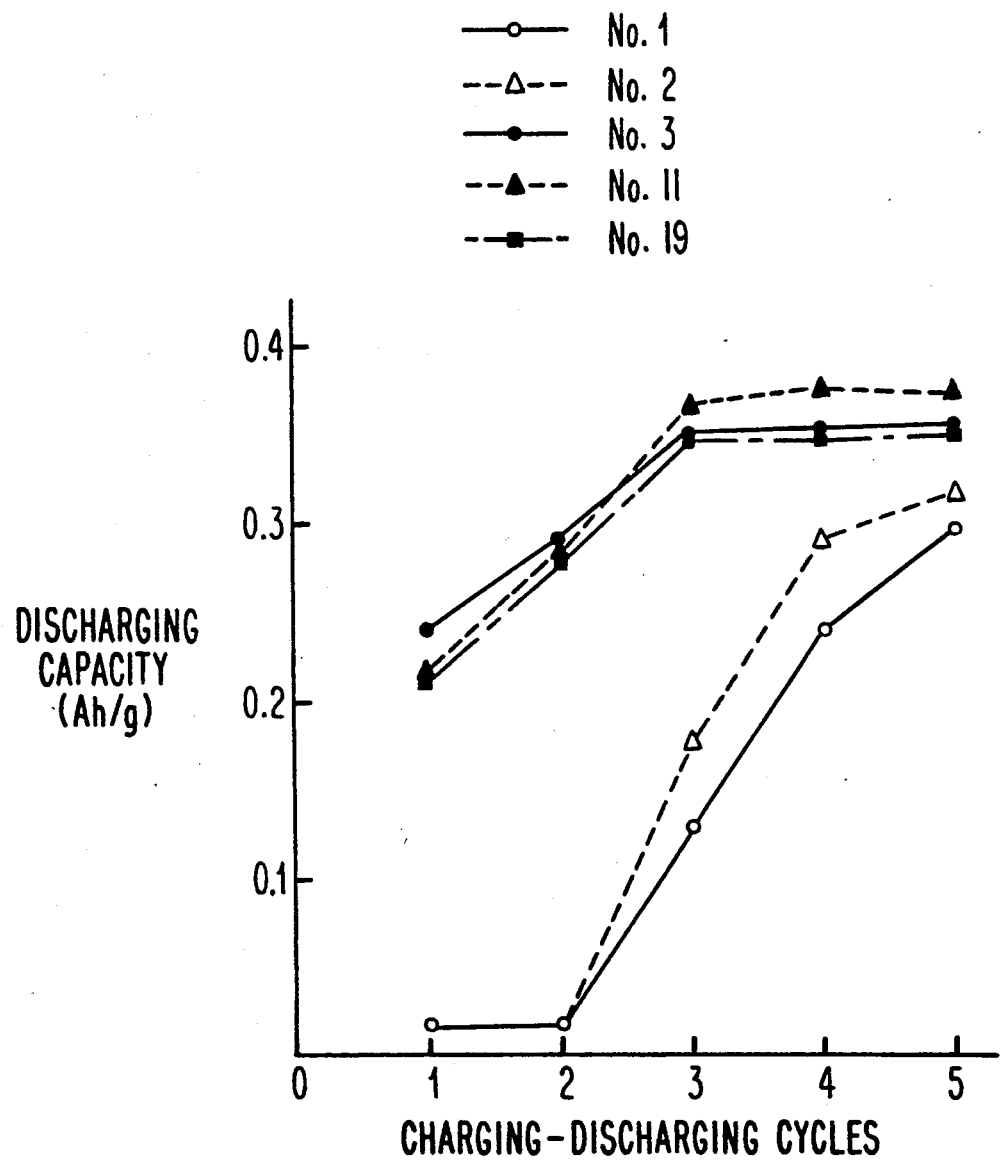
FIGS. 4A and 4B show the charging and discharging cycle characteristic curves obtained by half cell tests for hydrogen storage alloys of the present invention and for conventional hydrogen storage alloys.
Figure 4B:
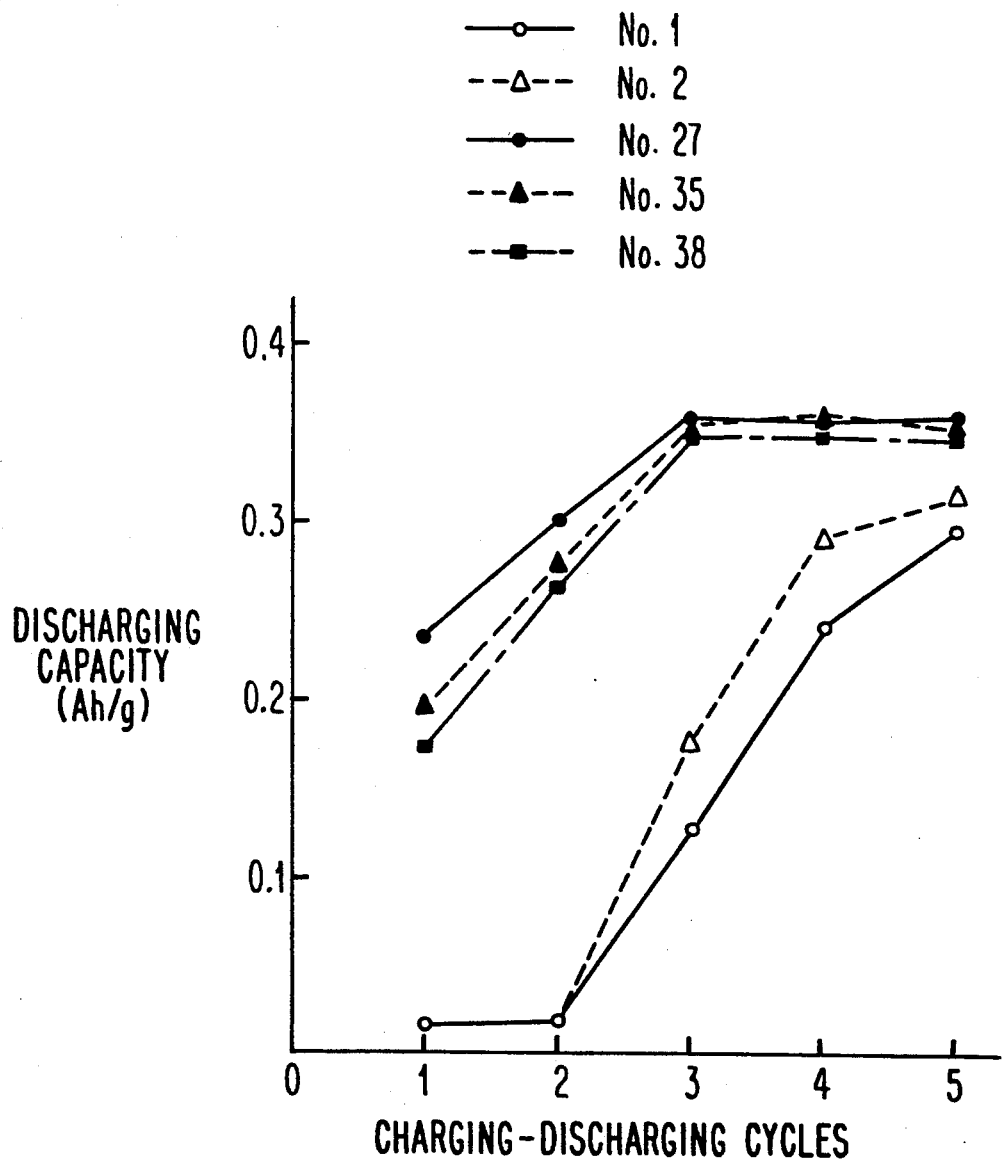

FIGS. 4A and 4B show some of the results of the half cell tests described above. In both the figures, the abscissa indicates the number of charging and discharging cycles, while the ordinate indicates the discharging capacity obtained for every 1 g of the hydrogen storage alloy. The numerals indicating the respective curves correspond to the sample Nos. listed in Table 1.

As can be seen from FIGS. 4A and 4B, the cells using samples 1 and 2 had discharging capacities in the range of 0.01 to 0.02 Ah/g in the first and second charging and discharging cycles, and they attained substantially constant discharging capacities from the tenth cycle. On the other hand, the cells using samples 3, 11 and 19 all had discharging capacities in the range of 0.2 to 0.24 Ah/g in the first cycle, and in the range of 0.27 to 0.3 Ah/g in the second cycle (see FIG. 4A). The cells using samples 27, 35 and 38 exhibited discharging capacities in the range of 0.15 to 0.24 Ah/g in the first cycle, and in the range of 0.25 to 0.3 Ah/g in the second cycle (see FIG. 4B). Furthermore, the batteries using the alloys of the present invention, i.e., samples 3, 11, 19, 27, 35 and 38, attained substantially constant discharging capacities in the range of 0.34 to 0.36 Ah/g from the third cycle.

It was thus found that the cells using the hydrogen storage alloys of the present invention exhibited excellent discharging characteristics in the early charging and discharging cycles, as compared with those using conventional alloys.

EXAMPLE 3

Enclosed-type nickel-hydrogen storage battery

The alloy samples 1, 2, 3, 11, 19, 27, 35 and 38 obtained in Example 1 were used to produce enclosed-type nickel-hydrogen storage batteries for the evaluation of the charging and discharging characteristics thereof.

First, each of the eight alloys listed above was ground to 400 mesh or finer, and then mixed with a dilute aqueous solution of carboxymethylcellulose (CMC). The mixture was stirred until it took the form of a paste. Next, the paste-like electrode material thus obtained was applied to an electrode support of a foamed nickel sheet having a thickness of 1.00 mm and a porosity of 95% with a mean pore size of 150$\mu$. The porous nickel sheet filled with the paste-like electrode material was dried at 120° C. and pressed by the use of a pressure roller, and then coated with a fluorocarbon resin powder. Thereafter, the whole was cut into individual electrodes each having a width of 3.3 cm, a length of 21 cm and a thickness of 0.40 mm.

Using each hydrogen storage alloy electrode thus produced, an enclosed-type nickel-hydrogen battery was produced as follows: First, two plates serving as leads were attached to the hydrogen storage alloy electrode at predetermined positions so that the electrode was used as a negative electrode. Next, the thus prepared negative electrode was rolled up together with a positive electrode and a separator, with a separator being disposed between the two electrodes, resulting in a cylindrical roll of electrodes. The cylindrical electrode roll thus obtained was placed in a vessel of an SC size. As the positive electrode, a known foamed nickel electrode of 3.3 cm in width and 18 cm in length was used. Two plates serving as leads were also attached to the positive electrode. A polypropylene nonwoven fabric provided with a hydrophilic property was used as the separator. For the preparation of the electrolytic solution, 30 g of lithium hydroxide was dissolved in 1 lit. of an aqueous potassium hydroxide solution with a specific gravity of 1.20. Finally, the electrolytic cell was sealed, resulting in an enclosed-type nickel-hydrogen battery. The capacity of the nickel-hydrogen battery thus produced was limited by that of its positive electrode; the theoretical capacity of the battery was set at 3.0 Ah.

In this example, ten such enclosed type nickel-hydrogen batteries were produced for each of the eight alloy samples in the above-described manner. The characteristics of each battery were evaluated by an ordinary charging and discharging cycle test as follows: The charging and discharging cycle was repeated at a temperature of 20° C. In charging, each battery was charged up to 150% at 0.5 C (2 hour ratio). The discharging was performed at 0.2 C (5 hour ratio) and continued until the battery voltage decreased to 1.0 V.

As a result, 10 to 15 charging and discharging cycles were needed to reach the theoretical capacity in batteries of samples 1 and 2. But only 3 to 5 charging and discharging cycles were needed to reach the theoretical capacity of 3.0 Ah in batteries of the samples of the present invention, and the batteries operated with stable battery capacities.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A hydrogen storage alloy of the general formula $ZrMn_wV_xM_yNi_z$ comprising C15-type Laves phases having a crystal structure similar to that of $MgCu_2$ as a main alloy phase, where M is an element selected from the group consisting of Fe and Co; w, x, y, and z are respectively the mole ratios of Mn, V, M and Ni to Zr; the conditions $0.4 \leq w \leq 0.8$, $0.1 \leq x \leq 0.3$, $0 \leq y \leq 0.2$, $1.0 \leq z \leq 1.5$ and $2.0 \leq w+x+y+z \leq 2.4$ are satisfied.

2. A hydrogen storage alloy according to claim 1, wherein V, M and Ni are contained in such amounts so as to satisfy the relationships $y \leq x$ and $z - x \leq 1.2$.

3. A hydrogen storage alloy according to claim 1, said hydrogen storage alloy having been heat-treated at a temperature of 1,000° C. to 1,300° C. in a vacuum or in an inert-gaseous atmosphere.

4. A hydrogen storage alloy electrode comprising the hydrogen storage alloy according to claim 1 or a hydride thereof.

5. A hydrogen storage alloy electrode comprising the hydrogen storage alloy according to claim 2 or a hydride thereof.

6. A hydrogen storage alloy according to claim 2, said hydrogen storage alloy having been heat-treated at a temperature of 1,000° C. to 1,300° C. in a vacuum or in an inert-gaseous atmosphere.

7. A hydrogen storage alloy electrode comprising the hydrogen storage alloy according to claim 3 or a hydride thereof.

* * * * *